United States Patent
Tanigawa

[19]

[11] Patent Number: 6,167,262
[45] Date of Patent: *Dec. 26, 2000

[54] COMMUNICATION APPARATUS

[75] Inventor: Yoshihiro Tanigawa, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/910,068

[22] Filed: Aug. 12, 1997

Related U.S. Application Data

[63] Continuation of application No. 08/437,275, May 8, 1995.

[30]     Foreign Application Priority Data

May 18, 1994 [JP] Japan .................................. 6-128285

[51] Int. Cl.[7] .................................................. H04Q 7/26
[52] U.S. Cl. ....................... 455/426; 455/462; 455/464; 455/555; 379/156; 379/165
[58] Field of Search ................................. 379/156, 157, 379/159, 160, 162, 163, 164, 165, 212, 211; 455/426, 462–466, 550, 555

[56]                References Cited

U.S. PATENT DOCUMENTS

| 4,768,218 | 8/1988 | Yorita ....................................... 455/463 |
| 4,962,524 | 10/1990 | Murata et al. ............................ 379/61 |
| 5,239,572 | 8/1993 | Saegusa et al. .......................... 379/156 |
| 5,259,020 | 11/1993 | Hirano ....................................... 379/61 |
| 5,283,817 | 2/1994 | Hara et al. ................................ 379/156 |
| 5,365,572 | 11/1994 | Saegusa et al. .......................... 379/156 |
| 5,517,551 | 5/1996 | Arai ......................................... 379/164 |

FOREIGN PATENT DOCUMENTS

| 0 294 233 A2 | 12/1988 | European Pat. Off. . |
| 0 354 049 A2 | 2/1990 | European Pat. Off. . |
| 0 354 049 A3 | 2/1990 | European Pat. Off. . |
| 62-48132 | 3/1987 | Japan . |
| 62-253235 | 11/1987 | Japan . |
| 64-72632 | 3/1989 | Japan . |
| 4-372252 | 12/1992 | Japan . |
| 6-121009 | 4/1994 | Japan . |

OTHER PUBLICATIONS

Jun. 9, 1998 Office Action issued by the Japanese Patent Office for Japanese Patent Application No. 6–128285.

*Primary Examiner*—Stella Woo
*Assistant Examiner*—Binh K. Tieu
*Attorney, Agent, or Firm*—Morgan & Finnegan, LLP

[57]                ABSTRACT

A communicating apparatus for performing a communication through a plurality of communication channels including a control channel is constructed by a detection unit to detect a hold request and a transmission unit to transmit a channel switch command to a terminal in a waiting state by the control channel. The transmitting unit transmits the channel switch command such that the terminal waits and responds to a held communication in a state where the terminal is switched from the control channel during a holding state.

16 Claims, 5 Drawing Sheets

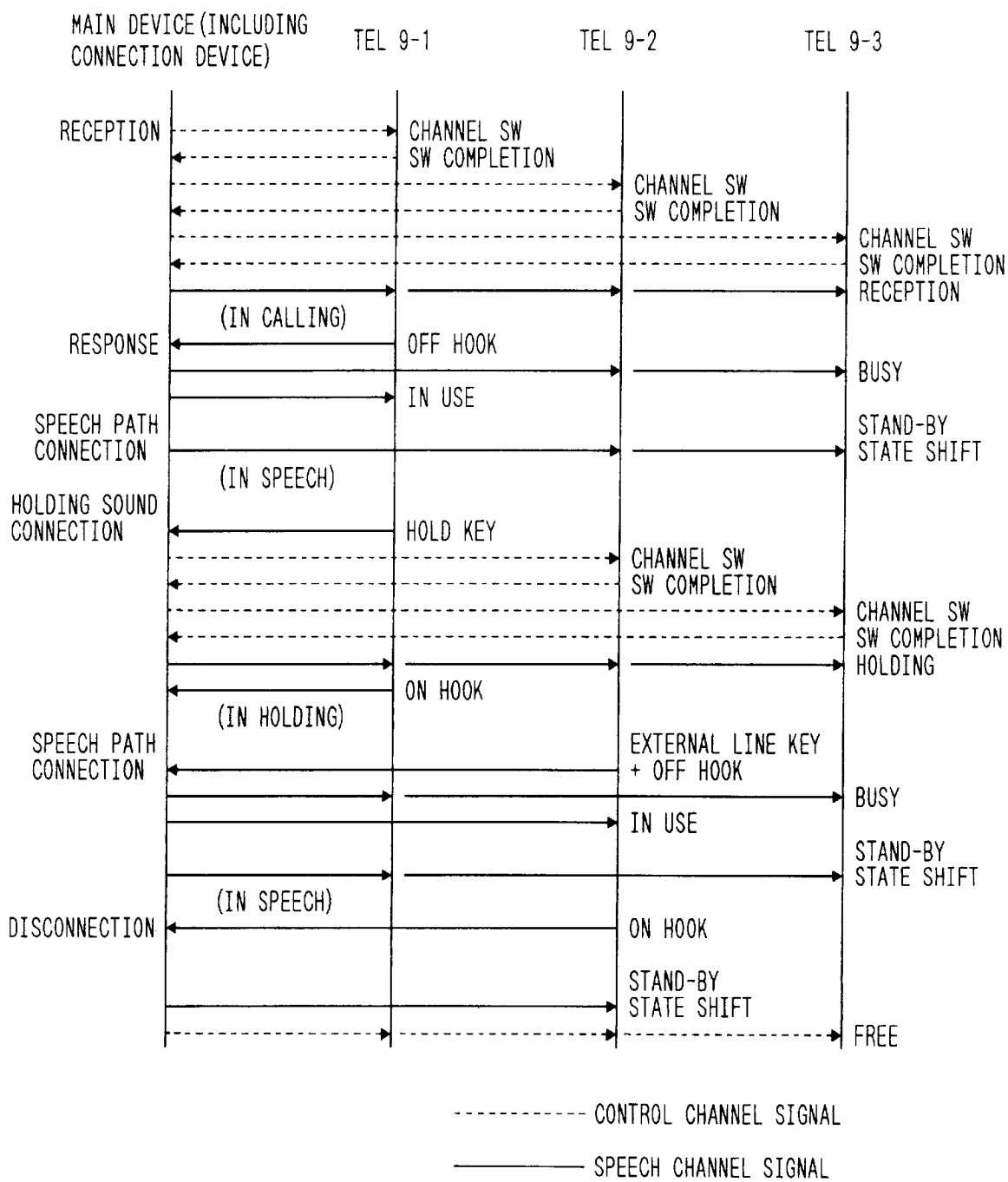

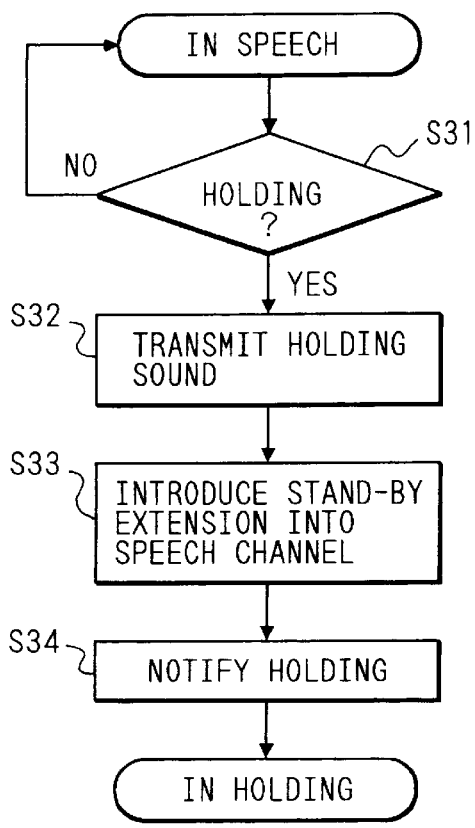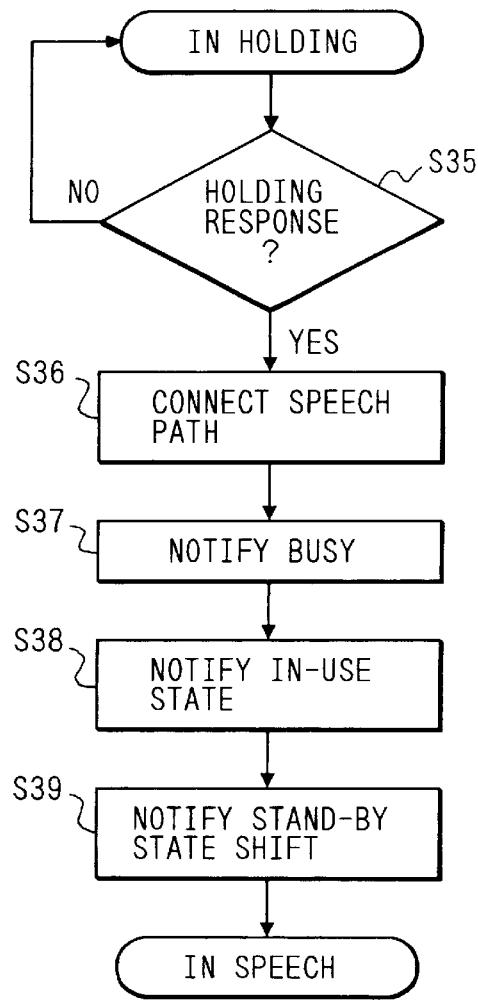

COMMUNICATION APPARATUS

This is a continuation of application Ser. No. 08/437,275, filed on May 8, 1995.

BACKGROUND OF THE INVENTION

1. Field of the Invention

The invention relates to a communication apparatus for communicating through one of a plurality of channels.

2. Related Background Art

Hitherto, in such a kind of apparatus, when a communication is held, the holding is notified to a cordless terminal in a stand-by state by transmitting LED information or the like by a control channel.

A cordless terminal which receives an oral transfer detects a free channel which can be used and shifts to the free channel when a response operation is executed. Therefore, a time until a shift to the free channel is needed until the apparatus is connected to an original partner who was held after a response operation had been performed.

SUMMARY OF THE INVENTION

It is an object of the invention to reduce a time necessary for restarting a communication which was held.

Another object of the invention is to solve a problem which occurs upon channel switching.

Still another object of the invention is to provide a communication apparatus in which when there is a hold request, by transmitting a channel switch command to a terminal in a stand-by state by a control channel, the terminal is allowed to stand by in a switched state from the control channel and to respond to the holding in such a state.

Further another object of the invention is to provide a communication apparatus for controlling so as to stand by in a switched state from a control channel when a terminal is in holding and to return to the control channel when another terminal responds to the holding.

Further another object of the invention is to provide a communication apparatus which waits in a switched state from a control channel when a terminal is in holding and which responds to the holding in such a state.

The above and other objects and features of the present invention will become apparent from the following detailed description and the appended claims with reference to the accompanying drawings.

BRIEF DESCRIPTION OF THE DRAWINGS

FIG. 2 is a sequence diagram showing the whole operation of the embodiment;

FIG. 3 is a flowchart at the time of a holding shift in the embodiment;

FIG. 4 is a flowchart at the time of a holding response in the embodiment;

DETAILED DESCRIPTION OF THE PREFERRED EMBODIMENTS

Figure 1:
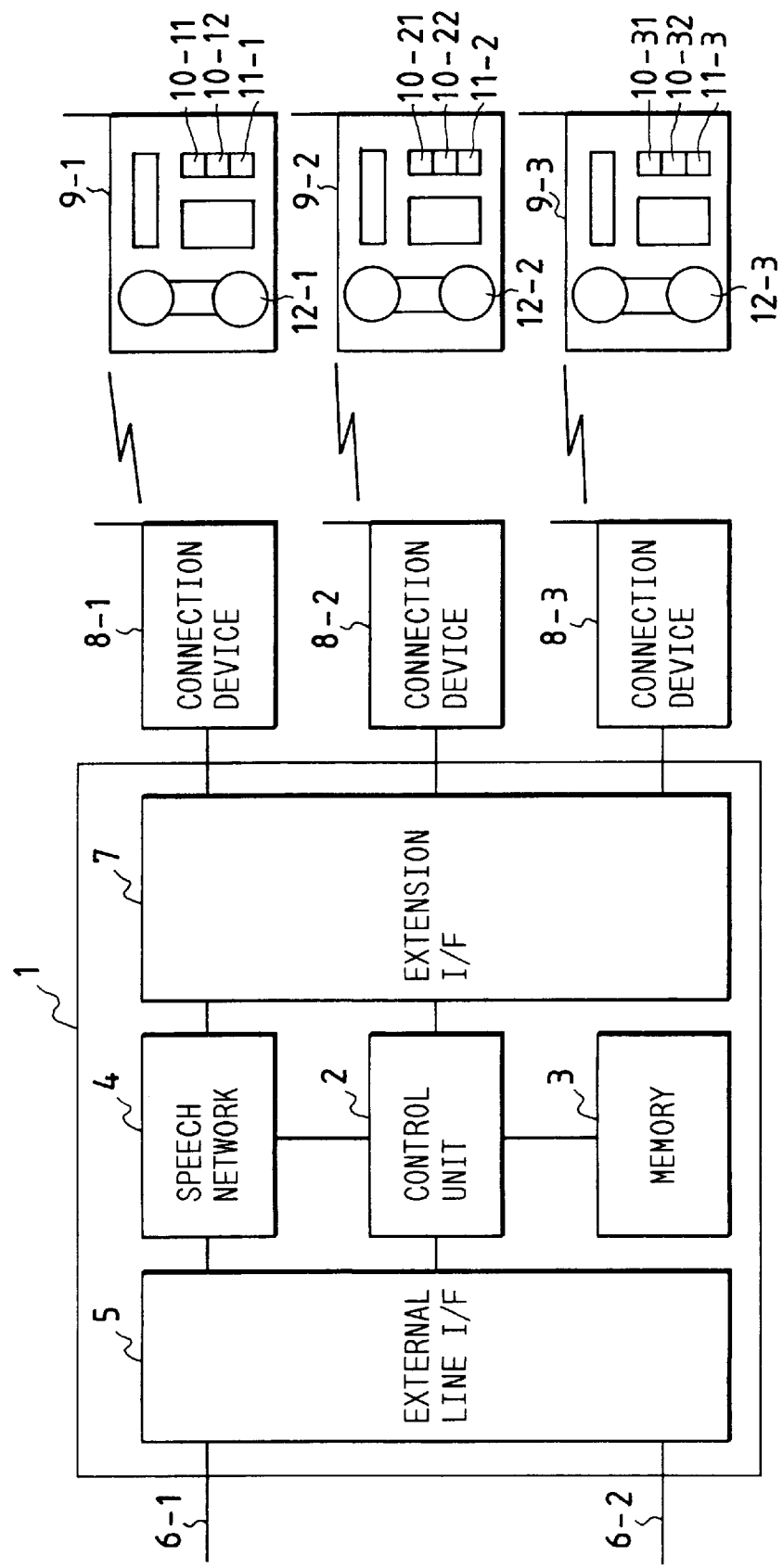
FIG. 1 is a block diagram showing an embodiment of the invention.

FIG. 1 is a block constructional diagram of an embodiment of the invention.

The embodiment relates to a key telephone system to which the invention is applied. A main device 1 of the key telephone system comprises: a control unit 2 to control the whole device; a memory 3 to store states and the like of external lines 6-1 and 6-2, telephones 9-1 to 9-3; a speech network 4 to control speech paths between the external lines 6-1 and 6-2 and the telephones 9-1 to 9-3; an external line interface 5; and an extension interface 7. The external I/F 5 encloses the external lines 6-1 and 6-2 and executes a reception detection, line capture/release, and a dial transmission. The extension I/F 7 encloses connection devices 8-1 to 8-3, controls communications with the connection devices 8-1 to 8-3, transmits various control information from the control unit 2 to the telephones 9-1 to 9-3, and receives various key information from telephones 9-1 to 9-3 to the control unit 2. The speech network 4 has a holding sound source.

Figure 5:
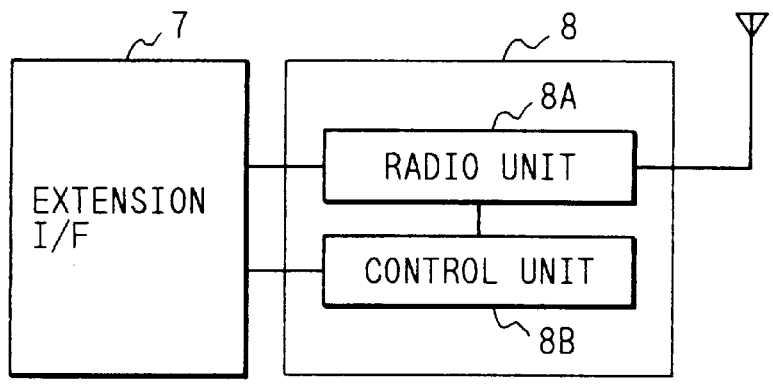
FIG. 5 is a block diagram of a connection device in the embodiment.

The connection devices 8-1 to 8-3 execute a radio control with the corresponding telephones 9-1 to 9-3, convert control information from the extension I/F 7 to radio waves, notify them to the telephones 9-1 to 9-3, convert the radio waves from the telephones 9-1 to 9-3, and notify as key information to the extension I/F 7. Constructions of the connection devices 8-1 to 8-3 are shown in FIG. 5. The connection device 8 has a radio unit 8A and a control unit 8B.

Further, each of the telephones 9-1 to 9-3 has an external line key 10 with an LED provided in correspondence to each of the external lines 6-1 and 6-2, a hold key 11, and a handset 12.

Figure 6:
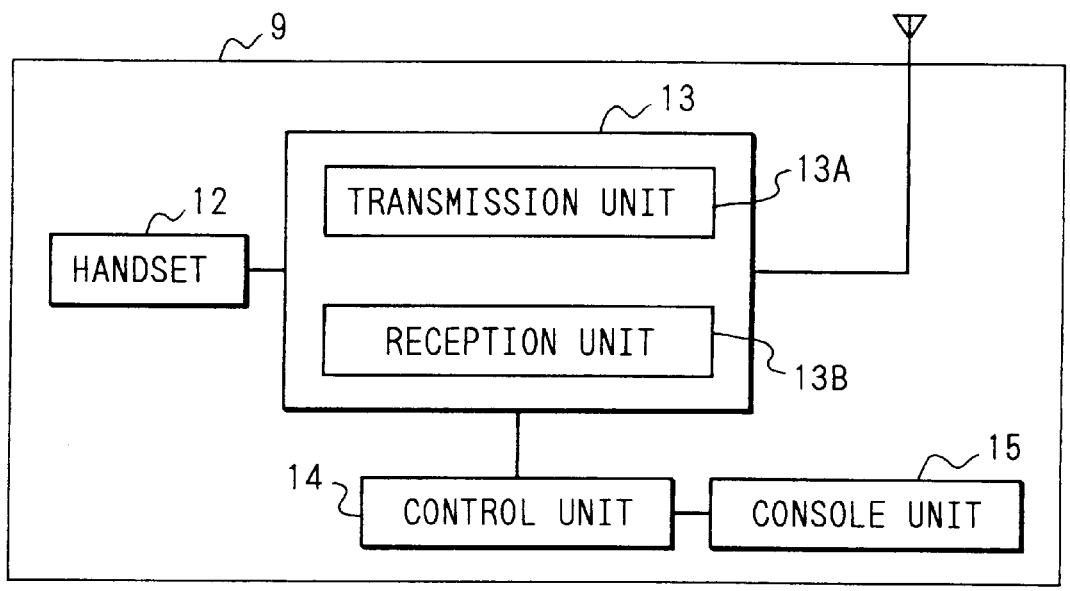
FIG. 6 is a block diagram of a telephone in the embodiment.

FIG. 6 shows a construction of the telephones 9-1 to 9-3. In addition to the handset 12, the telephone 9 further has: an operation unit 15 including the external line keys 10 and hold keys 11; a radio unit 13; and a control unit 14.

FIG. 2 is a sequence diagram showing the whole operation of the embodiment. In holding, each of the telephones 9-1, 9-2, and 9-3 receives a signal of a control channel.

First, when the control unit 2 detects a reception from the external line 6-1 through the external line I/F 5, the control unit 2 instructs the connection device 8-1 so as to introduce the telephone 9-1 to a speech channel. Therefore, the connection device 8-1 detects a free speech channel and instructs a channel switching by a control channel to the telephone 9-1 so as to shift to the speech channel. The telephone 9-1 returns a switching completion notification by the control channel and shifts to the speech channel.

The control unit 2 controls the connection devices 8-2 and 8-3 in a manner similar to that mentioned above, so that the telephones 9-2 and 9-3 are shift to the speech channel.

The control unit 2 notifies a reception to each of the telephones 9-1, 9-2, and 9-3 through each of the connection devices 8-1, 8-2, and 8-3. Each of the telephones 9-1, 9-2, and 9-3 rings a reception sound and displays the reception by an LED of each of external line keys 10-11, 10-21, and 10-31 (the LED flickers in red at a high speed).

When the telephone 9-1 is off-hooked, off-hook information is notified to the control unit 2 through the connection device 8-1. The control unit 2 controls the external line interface 5, captures the external line 6-1, responds to the reception, controls the speech network 4, and connects a speech path between the external line 6-1 and the telephone 9-1.

The control unit 2 notifies a busy state to the telephones 9-2 and 9-3 through the connection devices 8-2 and 8-3. Thus, the telephones 9-2 and 9-3 stop the generation of a reception sound and displays a busy state by the LEDs of the external line keys 10-21 and 10-31 (the LED is lit on in red).

The control unit 2 notifies a state in-use to the telephone 9-1 through the connection device 8-1. Thus, the telephone 9-1 stops the generation of a reception sound and displays a state in-use by the LED of the external line key 10-11 (the LED is lit on in green). Further, the control unit 2 notifies a stand-by state shift to the telephones 9-2 and 9-3 through the connection devices 8-2 and 8-3. Each of the telephones 9-2 and 9-3 is returned from the speech channel to the control channel. Only the telephone 9-1 is set to a state in-speech with the external line 6-1 by the speech channel.

The operation in the case where the telephone 9-1 performs a holding operation will now be described with reference to FIG. 3.

First, when the connection device 8-1 receives depression information of a hold key 11-1 through the speech channel, such a fact is notified to the control unit 2. When such a notification is received (step S31), the control unit 2 controls the speech network 4 and connects a holding sound to the external line 6-1 (S32). The control unit 2 also instructs the connection device 8-2 so as to introduce the telephone 9-2 to the speech channel. The connection device 8-2 detects a free speech channel and instructs the channel switching by a control channel to the telephone 9-2 so as to shift to the speech channel. The telephone 9-2 returns a switching completion notification by the control channel and shifts to the speech channel.

Further, the control unit 2 controls the connection device 8-3 in a manner similar to that mentioned above, so that the telephone 9-3 is also shifted to the speech channel (S33).

Subsequently, the control unit 2 sends the holding notification to the telephones 9-1, 9-2, and 9-3 through the connection devices 8-1, 8-2, and 8-3 (S34). When the holding notification is received by the speech channel, each of the telephones 9-1, 9-2, and 9-3 displays a holding state by the LED of each of the external line keys 10-11, 10-21, and 10-31 (the LED flickers in red in a low speed).

By the above processes, all of the telephones can respond to the holding of the external line 6-1 in a state in which they were shifted to the speech channel.

The operation in the case where the user of the telephone 9-1 on-hooks and notifies a transfer by an oral sound to the user of the telephone 9-2 and the user of the telephone 9-2 responds to the holding will now be described with reference to FIG. 4.

First, when the connection device 8-2 receives the depression information and off-hook information of the external line key 10-21 through the speech channel, its fact is notified to the control unit 2. When such a notification is received (S35), the control unit 2 controls the speech network 4 and connects a speech path between the external line 6-1 and the telephone 9-2 (S36). The control unit 2 also sends a busy notification to the telephones 9-1 and 9-3 through the connection devices 8-1 and 8-3 (S37). When the busy notification is received by the speech channel, the telephones 9-1 and 9-3 display a busy state by the LEDs of the external line keys 10-11 and 10-31 (the LED is lit on in red).

Further, an in-use notification is sent to the telephone 9-2 through the connection device 8-2 (S38). When the in-use notification is received by the speech channel, the telephone 9-2 displays an in-use state by the LED of the external line key 10-21 (the LED is lit on in green). A stand-by state shift notification is sent to the telephones 9-1 and 9-3 through the connection devices 8-1 and 8-3 (S39). When such a notification is received by the speech channel, the telephones 9-1 and 9-3 are returned to the control channel. Only the telephone 9-2 is set into an in-speech state with the external line 6-1 by the speech channel.

Finally, the operation in the case where the telephone 9-2 is on-hooked and finishes the speech will be described.

First, on-hook information is notified to the control unit 2 through the connection device 8-2. Thus, the control unit 2 controls the external line I/F 5, opens the external line 6-1, controls the speech network 4, and disconnects the speech path between the external line 6-1 and telephone 9-2.

The stand-by state shift notification is sent to the telephone 9-2 through the connection device 8-2 and the telephone 9-2 is shifted to the stand-by state. Further, a free notification is sent to all of the telephones 9-1, 9-2, and 9-3 by using all of the connection devices 8-1, 8-2, and 8-3 through the control channel. All of the telephones 9-1, 9-2, and 9-3 display a free-state by the LEDs of the external line keys 10-11, 10-21, and 10-31 (the LED is lit off).

In the embodiment, in the case where the telephone 9-1 is held, the control unit 2 shifts both of the telephones 9-2 and 9-3 to the speech channel through the connection devices 8-2 and 8-3 and, after that, the holding is notified to the telephones 9-1, 9-2, and 9-3. However, it is also possible to construct in a manner such that the control unit 2 notifies the holding to the connection devices 8-1, 8-2, and 8-3, each of the connection devices 8-1, 8-2, and 8-3 judges whether the corresponding telephone has been shifted to the speech channel or not, the connection device 8-1 notifies the holding to the telephone 9-1 as it is, and the connection devices 8-2 and 8-3 shift the telephones 9-2 and 9-3 to the free speech channel and subsequently notify the holding.

By such a method as mentioned above, the load of the control unit 2 can be reduced and the whole holding processing speed can be raised.

In the embodiment, further, when the telephone 9-1 is held, the channel switching is executed by the control channel for the telephones 9-2 and 9-3 and they are shifted to the speech channel and, after that, the holding is notified by the speech channel. However, it is also possible to add holding information to a channel switching notification at the control channel and to notify the channel switching and holding notifications by only the control channel.

The embodiment has been described with respect to the example in which all of the extensions which are connected to the extension I/F 7 are the cordless telephones. However, wire telephones can be also connected or data communication apparatuses can be also connected in place of the telephones.

The invention can be also applied to the case where the wire telephone connected to the extension I/F 7 was held. In this case, when the wire telephone is held, a channel switching is instructed to the cordless telephones 9-1 to 9-3.

It is also possible to use only one external line. It is also possible to use only one connection device. So long as there is a wire telephone, it is possible to use only one cordless telephone.

Figure 7:
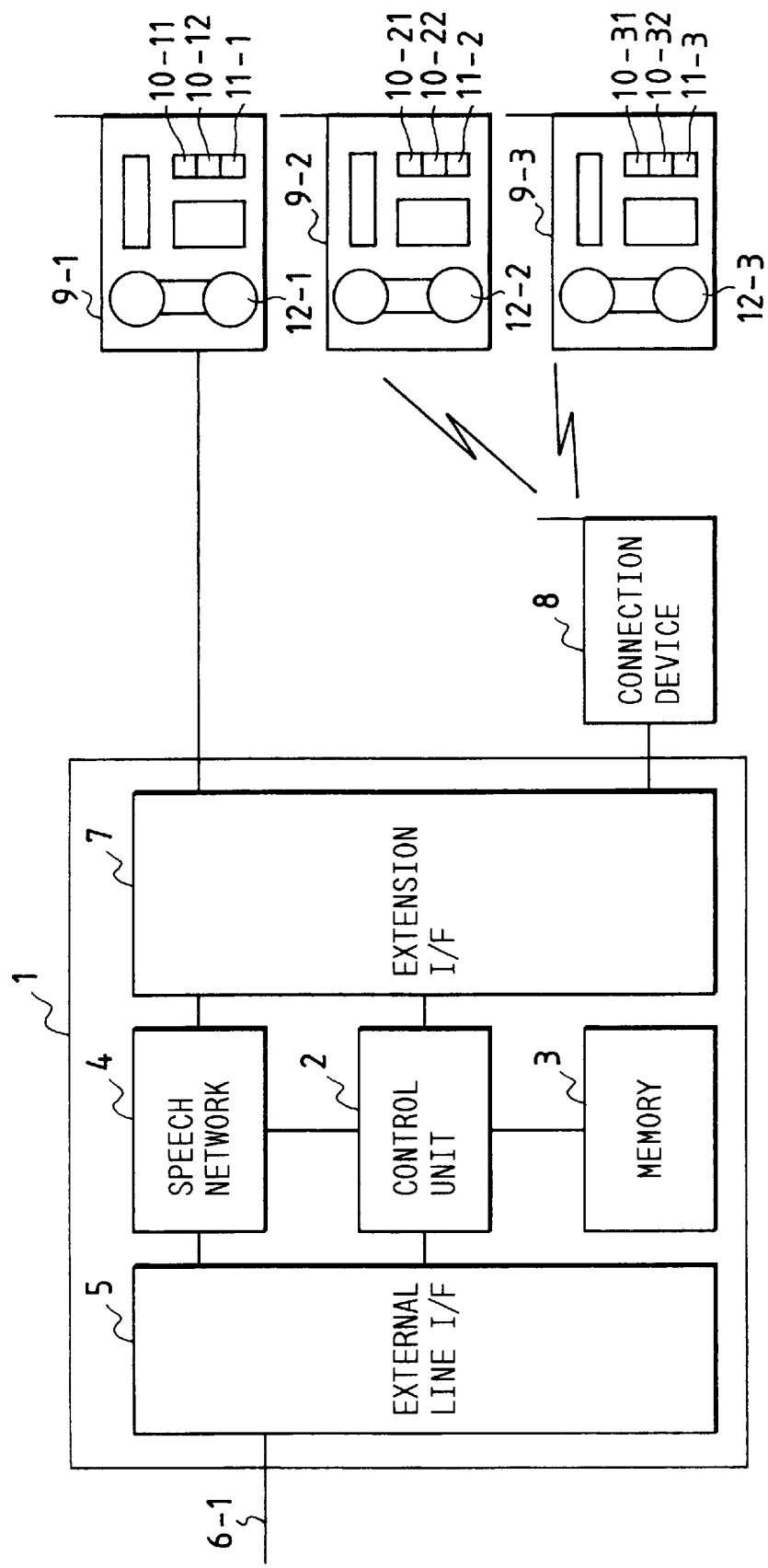
FIG. 7 is a block diagram of another embodiment.

FIG. 7 shows a modification as mentioned above. In FIG. 7, the same component elements as those shown in FIG. 1 are designated by the same reference numerals and their descriptions are omitted here.

The main device 1 and telephone 9-1 can be also integratedly formed.

The invention can be also applied to other various communication apparatuses irrespective of a modulating method of a signal so long as such an apparatus performs a communication through a plurality of communication channels of different frequencies.

What is claimed is:

1. A communicating apparatus for performing a communication through a plurality of communication channels including a control channel, comprising:

detecting means for detecting a hold request, transmitting means for transmitting a channel switch command to first and second terminals in stand-by states via the control channel, wherein the first and second terminals wait to respond to a held communication in a state where being switched from the control channel; and receiving means for receiving a hold response from a hold response terminal of the first and second terminals being switched from the control channel, wherein said transmitting means transmits a stand-by state shift command to one of the first and second terminals other than the hold response terminal, being switched from the control channel.

2. An apparatus according to claim 1, further comprising:

connecting means for connecting an external line and a first, second or third extension, wherein said detecting means detects the hold request from the first extension, and said transmitting means transmits the channel switch command to the second and third extensions.

3. An apparatus according to claim 1, wherein said transmitting means transmits the channel switch command through a radio line.

4. An apparatus according to claim 1, further comprising:

restarting means for restarting the held communication.

5. An apparatus according to claim 1, wherein said transmitting means transmits the stand-by state shift command wherein one of the first and second terminals waits via the control channel.

6. An apparatus according to claim 1, further comprising:

holding means for holding a communication.

7. An apparatus according to claim 1, wherein said transmitting means transmits the channel switch command to the first and second terminals in response to the hold request without a transfer destination.

8. An apparatus according to claim 1, wherein said transmitting means transmits the channel switch command to the first and second terminals which are not designated as a transfer destination.

9. A method for controlling a communication performed through a plurality of communication channels including a control channel, comprising the steps of:

detecting a hold request;

transmitting a channel switch command to first and second terminals in stand-by states via the control channel, wherein the first and second terminals wait to respond to a held communication in a state where being switched from the control channel;

receiving a hold response from a hold response terminal of the first and second terminals being switched from the control channel; and transmitting a stand-by state shift command to one of the first and second terminals other than the hold response terminal, being switched from the control channel.

10. A method according to claim 9, wherein said detecting step detects the hold request from a first extension, and said transmitting step transmits the channel switch command to second and third extensions.

11. A method according to claim 9, wherein said transmitting step transmits the channel switch command through a radio line.

12. A method according to claim 9, further comprising the steps of:

restarting the held communication.

13. A method according to claim 9, wherein one of the first and second terminals waits via the control channel.

14. A method according to claim 9, further comprising the step of holding a communication.

15. A method according to claim 9, wherein said transmitting steps transmits the channel switch command to the first and second terminals in response to the hold request without a transfer destination.

16. A method according to claim 9, wherein said transmitting step transmits the channel switch command to the first and second terminals which are not designated as a transfer destination.

* * * * *